United States Patent Office 3,097,192
Patented July 9, 1963

3,097,192
ELASTIC FILAMENTS FROM POLYESTER-
URETHANE-UREA POLYMERS
Roberta J. Schilit, Wilmington, Del., assignor to E. I. du
Pont de Nemours and Company, Wilmington, Del., a
corporation of Delaware
No Drawing. Filed Jan. 9, 1958, Ser. No. 707,861
12 Claims. (Cl. 260—75)

This invention relates to elastic filaments prepared from linear, segmented polymers comprising urea segments linked to polyester segments through urethane groups. It further relates to the critical selection of polyesters and urea-forming reactants which provide filaments of high elasticity.

There is a particular need in the textile field for elastic filaments to replace rubber. Most rubber fibers that are used in textile applications are tiny strips of film that have been cut from a sheet of rubber. This sheet, before slitting, has to be milled with stabilizers and curing agents and cured at elevated temperatures for several minutes. The fibers or film strips produced by this route have many disadvantages. First, really fine denier fibers cannot be produced because of the limits imposed by the cutting process; furthermore, rubber is so weak and has such poor abrasion resistance that fine denier yarns cannot be practically produced. The process for producing the rubber yarns is expensive and their durability in ultraviolet light is poor. It is therefore desirable to find an elastomer which has improved toughness suitable for making fine denier yarns and consequently lighter weight fabrics. Improved toughness in yarns will also give improved service (less failure by breaking) in fabrics. It is desirable to find an elastomer which can be spun into yarn by relatively cheap melt- or dry-spinning processes. Furthermore, an elastic fiber with greater ultraviolet durability than rubber would be desirable.

Many synthetic rubbers have been developed in recent years. Of these, a polyurethane rubber based on linear polyesters has become well known under the name of Vulcollan. Vulcollan is described in articles by O. Bayer et. al, 23 Rubber Chemistry and Technology 812–835 (1950), and E. Muller et al., 26 Rubber Chemistry and Technology 493–509 (1953). These references show that Vulcollan is prepared by reacting an isocyanate-modified polyester with a suitable chain-extender, e.g., a diamine, to produce a linear polyester-urethane-urea intermediate which is then cross-linked or "cured" to produce the final Vulcollan product. Thus, as with many of the recently developed synthetic rubbers, Vulcollan has a cross-linked structure which renders it useless for the spinning of elastic fibers. This structure is described on page 818 of the above-cited Bayer article as follows: "The essentially linear forms are united at relatively few points by the formation of a network, but this structure imparts the highly elastic and valuable properties to the products." The art of Vulcollan in particular, and polyurethane elastomers in general, has become quite complex and crowded, but in all of this art there has been no recognition that the uncross-linked intermediate may form useful articles without a curing step.

Brenschede U.S. 2,755,266 purports to teach the preparation of so-called elastic fibers from the Vulcollan products. Like his predecessors, Brenschede considers his polymers cross-linked, and is surprised to find that they form solutions. The "elastic fibers" described in this reference have extremely poor elastic properties and are quite unsuitable for commercial use. The reference, furthermore, fails to teach the critical selection of polyesters and urea-forming reactants, to which the present invention relates.

There has, thus, been no recognition of the critical selection of starting materials necessary to make a suitable elastic fiber. On page 505 in the above-cited Muller article, the statements appear "In addition to reaction velocity, the mechanical properties are also influenced by the diisocyanate-diamine combination. . . . By means of the variety of possible combination, it is possible to vary the over-all properties of the products in any particular desired manner." But nowhere is it recognized or taught which diisocyanates, which polyesters, and which diamines together yield elastic fibers having the necessary properties for commercial textile use.

Copending application Frankenburg S. N. 485,295, filed January 31, 1955, teaches the preparation of elastic filaments from certain segmented polyether-urethane-ureas. A disadvantage in the use of polyethers such as poly(tetramethylene oxide) and poly(ethylene oxide) for such elastic filaments is the impairment of elasticity at extremely low temperatures. This deficiency curtails the utility of the otherwise very useful elastic filaments from polyether-urethane-urea polymers.

An object of this invention, therefore, is to provide soluble linear polymers of the polyester-urethane-ureas which are suitable for shaping into elastic fibers. Another object is to provide elastic fibers composed of segmented polyester-urethane-ureas which have the required elastic properties by virtue of critically selected reagents. An additional object is to provide polyester-urethane-urea elastic fibers having good hydrolytic stability and low temperature elasticity. A further object is to provide elastic filaments with high sticking temperatures. Other objects will appear as the description of the invention proceeds.

The objects of this invention are accomplished by the provision of an elastic fiber having a high fiber sticking temperature, a tensile recovery of not less than 90%, a stress decay of less than 20%, and comprising a segmented, substantially linear, polyester-urethane-urea polymer, the polyester segment being the residue on removal of terminal OH groups from a hydroxyl-terminated polyester having a melting point below about 60° C. and a molecular weight above about 600, the said segment being connected through urethane linkages to a second segment, said second segment being at least one repeating unit of a urea polymer having a melting point above about 200° C. in its fiber-forming molecular weight range (above about 10,000), said second segment containing in the polymer chain chemically united to said urethane linkage, a symmetrical divalent aromatic radical free of fused rings.

The polymers which make up the elastic fibers of this invention may be diagrammatically represented. One repeating unit of such a polymer is:

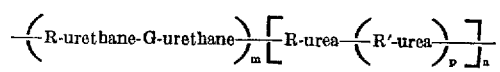

wherein G represent the residue on removal of the terminal OH groups from a hydroxyl-terminated polyester having a melting point below about 60° C. and a molecular weight above about 600; R is a symmetrical divalent aromatic radical containing no fused rings; R' is a divalent organic radical; m and n are integers greater than zero; and p is either zero or one. R and R' are chosen such that the polyurea

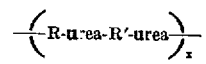

(or alternatively the polyurea

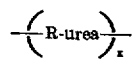

when $p$ equals zero) melts above 200° C. in the fiber-forming molecular weight range.

One method for preparing such polymers is to react a selected polyester with a molar excess of a symmetrical aromatic diisocyanate free of fused rings to provide a polymer with terminal isocyanate groups. The isocyanate-terminated polymer is then reacted with an organic diamine or water to provide the linear segmented polymers which may be shaped into the elastic fibers of this invention. The filaments from the polymers used herein have outstandingly high fiber sticking temperatures. Such temperatures will usually be above 150° C.

One embodiment of this invention is shown in the following diagrammatic formula:

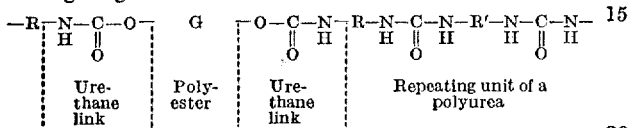

| Urethane link | Polyester | Urethane link | Repeating unit of a polyurea |

The structure of one repeating unit of a segmented polymer falling within the scope of this invention is set forth. The polymer represented therein is formed by reacting one mole of a hydroxyl-terminated polyester HO—G—OH with 2 moles of a symmetrical aromatic diisocyanate free of fused rings, R(NCO)$_2$, and then the isocyanate-terminated polyester is reacted with an organic diamine, R'(NH$_2$)$_2$. In order to maintain the linear structure of the polymer, it will be readily apparent that the organic diamine must be free of substituents, other than the two amino groups, which under the reaction conditions used are reactive with isocyanate. In this embodiment, subscripts $m$, $n$ and $p$ in the representation above are all equal to unity. In describing embodiments in which diamines in general, i.e., diamines including heterocyclics such as piperazines, may be used, the radical Q may be conveniently substituted for the structure

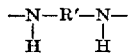

illustrated in the foregoing diagrammatic formula. As will be apparent from the disclosure which follows later herein, Q may be described as a bivalent organic radical selected from the group consisting of the formula

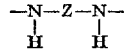

and a piperazino radical, wherein Z is selected from the group consisting of alkylene, cyclohexylene, aralkylene, arkarylene and arylene radicals. The radical R provided by the diisocyanate may be described as a symmetrical aromatic radical selected from the group consisting of para-positioned phenylene, biphenylene and alkylene diphenyl radicals.

It is to be understood that the term diisocyanate also includes the corresponding diisothiocyanates and the term urea includes the thioureas and urethane includes the corresponding thiourethanes in the specification and claims.

For utility in fiber and filament applications, it is desirable to have elastic products which require no after-curing or after-treatment. In order to be suitable in textile applications for the replacement of rubber yarns, a synthetic elastic fiber should have the following properties as a minimum requirement.

Tensile recovery of 90% or more,
Stress decay of less than 20%, and
Fiber sticking temperature of over 150° C.

"Tensile recovery" is the percentage return to the original length within one minute after the tension has been released from a fiber sample which has been elongated 50% at the rate of 100% per minute, and held at 50% elongation for minute. "Stress decay" is the percent loss in stress in a yarn one minute after it has been elongated to 50% at the rate of 100% per minute. "Polymer melt temperature" is the minimum temperature at which a sample of the polymer leaves a wet, molten trail as it is stroked with moderate pressure across a smooth surface of a heated brass block. The "polymer melt temperature" has sometimes in the past been referred to as the "polymer stick temperature." The "fiber stick temperature" is the temperature at which the fibers will just stick to a heated brass block when held against the surface of the block for 5 seconds with a 200 g. weight.

Elastic fibers having the above-described minimum requirements are provided by the segmented polyester-urethane-urea polymers described above. These polymers are composed of "soft segments" and "hard segments" alternating in the polymer chain. The "soft segment" is a polyester having a molecular weight between about 600 and 5000 and melting below about 60° C. As indicated above, such a polymer may be reacted at each end with a suitable quantity of certain aromatic diisocyanates. The isocyanate-terminated "soft segments" may then be united by reaction with a suitable diamine. The isocyanate-amine-isocyanate portion of the resulting polymer chain then constitutes the "hard segment." For elastic fiber applications, the suitable diisocyanates used to provide isocyanate ends for the "soft segments" should be able to form in an independent reaction with the diamine a polymer with a melting point above 200° C. when its molecular weight is high enough to be in the fiber-forming range (above about 10,000). The preferred elastomeric products for fiber applications have melting points above about 150° C., and the "soft segments" of the preferred elastomers have molecular weights between 1000 and 3000. To produce polymers which are elastomers at room temperature, it is required that the "soft segments" comprise about 60 to 90% by weight of the polymeric product.

Fibers of deniers as low as 1 to about 20 may be dry spun from the polymers of this invention. Fibers of from about 20 to 200 may be prepared by wet spinning.

The polyester from which the "soft segment" in the elastomer is derived may contain a single type of linkage such as in the conventional polyesters, or it may have more than one type of linkage, as in the polyesters chain-extended with diisocyanates. In the latter case, ester and occasionally urethane linkages occur in the polymer chain. Even where the linkages are the same, the compositions may be a copolymer such as a copolyester. Copolymer formation is a useful method for modifying the properties of the polyester "soft segment," such as for reducing the melting point to a useful level. The polyester may be substituted with halogen, alkyl, and similar groups which do not interfere with the subsequent polymerization under the conditions used. In the practice of the invention, the proper reactants are chosen to produce a low molecular weight polymer with hydroxyl end-groups and with the required low melting point. Compounds with the desired combination of molecular weight and low melting point are usually obtained by interrupting the structure frequently with side chains or by introducing atoms other than carbon atoms into the main polymer chain.

The low molecular weight polyesters used in the practice of this invention can be prepared by reacting acids, esters, or acid halides with a molar excess of glycols. suitable glycols are the polymethylene glycols, e.g., ethylene, propylene, butylene, decamethylene, substituted polymethylene glycols, such as 2,2-dimethyl-1,3-propanediol, and cycloaliphatic glycols such as cyclohexanediol. These glycols may be reacted with the proper molar ratio of aliphatic, cycloaliphatic or aromatic acids or their ester-forming derivatives to produce low molecular weight polymers terminated essentially with hydroxyl groups, although the presence of a few carboxyl end-groups is not detrimental. Suitable acids for preparing polyesters and/or copolyesters are succinic, adipic, suberic, sebacic, isophthalic, and hexahydroisophthalic acids. The alkyland halogen-substituted derivatives of these acids may also be used. In any case, a polyester is chosen such that it melts below 60° C. A polyester melting below 50° C. is preferred.

Any symmetrical aromatic diisocyanate, the structure of which is free of fused rings, is suitable for the preparation of elastic fibers according to this invention. The symmetrical aromatic diisocyanates are used because they form polyureas of extremely high melting point. A "hard segment" containing a unit of such a polymer provides an excellent "tie point" for joining the low-melting, amorphous "soft segments," so that a polymer is produced having good elastic properties, i.e., a high tensile recovery and a low stress decay. Suitable diisocyanates include p-phenylene diisocyanate, 4,4'-biphenylene diisocyanate, p,p'-methylene-diphenyl diisocyanate, and p,p'-isopropylidenediphenyl diisocyanate. The diisocyanates may contain other substituents, although those which are free from reactive groups other than two isocyanate groups are ordinarily preferred. Diisocyanates containing fused rings, e.g., 1,5-naphthylene diisocyanate, are not suitable in the practice of this invention, because they tend to produce polyester-urethane-ureas which are difficultly soluble in solvents which are useful for spinning of fibers, generally yielding gelled polymers. The preferred diisocyanate is p,p'-methylenediphenyl diisocyanate.

As indicated above, the elastic properties obtained by this invention result in part from the novel combination of a segment of a "hard" or high-melting polymer with a "soft" or low-melting polymeric segment. The polymers from which the former segments are derived all melt above 200° C., as, for example, poly(p,p'-methylenediphenylurea), melting at 305° C. with decomposition. The diamines useful as components for the "hard segments" are aliphatic, alicyclic, aromatic, or heterocyclic diamines. To form elastic fibers, it is required that the diamine be combinable with the symmetrical aromatic diisocyanate, in an independent reaction from that used in preparing the elastomers of the invention, to form a polyurea melting above 200° C. Suitable diamines include ethylenediamine, tetramethylenediamine, pentamethylenediamine, hexamethylenediamine, octamethylenediamine, p-xylylenediamine, cyclohexylenediamine, p-phenylenediamine, p,p'-methylenedianiline, tolylenediamine, piperazine, and many others. Symmetrical aliphatic diamines are preferred.

Although the "hard segments" have been described as repeating units of urea polymers, it is not essential that such a polymer be a homopolymer. Except in those instances where the divalent radical of the diisocyanate and the diamine are the same, the "hard segment" will be a repeating unit of a copolyurea. Such a copolymer may also contain urethane, amide, or sulfonamide linkages. The preferred length of the "hard segment" depends upon the melting point of the segment and to some extent upon the molecular weight of the polyester "soft segment." The length of the "hard segment" may be controlled by adding additional amounts of diisocyanate together with the diamine or water in the chain-extending reaction of the isocyanate-terminated polyester. When no added quantity of diisocyanate is used, the length of the "hard segment" will be at a minimum. As the "hard segment" becomes shorter, it is preferred that it be a unit of a higher melting polymer. For those segmented polymers in which the urea segment is reduced to the minimum length (i.e., the polyester segments are separated by only a single unit of the polyurea), it is preferred that this be a unit of a polymer which melts above 250° C. Urea polymers are preferred over other polymers for "hard segments," because elastomers having urea "hard segments" display superior mechanical properties (tensile recovery and stress decay) and higher fiber sticking temperatures.

As indicated above, the polyesters making up the "soft segments" of the elastomer may be homopolymers or copolymers. The essential features are that they be difunctional and have a melting point below 60° C. For example, poly(ethylene adipate) having a molecular weight of about 2100 has a melting point of 44–48° C. The melting points of the polyesters are generally not sharp and may vary for a given molecular weight. Copolymers usually melt lower and show less tendency toward undesirable crystallization in the final segmented polymer. However, polymers used in accordance with this invention are similar in filament-forming and elastic properties, while polymers prepared outside the molecular weight limitations of this invention will differ in such properties.

Elastic fibers of this invention show an unexpectedly high level of hydrolytic stability. This property is important in considering the utility of these fibers in textile application wherein the fibers will be subjected to repeated launderings. From the statement in "Fibers From Synthetic Polymers" by R. Hill, "On account of their low melting points and poor resistance to hydrolytic attack, the aliphatic polyesters have achieved no technical importance for synthetic fibers," one would not expect to be able to prepare a laundry-stable fiber from aliphatic polyesters. Omitting the laundry-stable terephthalate esters which generally melt too high for a suitable "soft segment," one would thus not be led to prepare linear polyester-based elastomers for shaping into fibers having good hydrolytic stability. It is therefore quite surprising to find that the elastic fibers of this invention, derived from aliphatic polyesters, show such good hydrolytic stability. When the ester function is hindered, as with polyesters from 2,5-hexanediol and 2,2-dimethyl-1,3-propanediol, the hydrolytic stability is further enhanced.

The use of polyesters in the "soft segments" of the elastomers of this invention has the advantage over the use of polyethers for the same purpose in that the greater abundance of polyesters and copolyesters affords a greater versatility in the choice of a suitable "soft segment" which affords wider variation in the properties of the resulting elastomers. Furthermore, it is a surprising advantage of the polyester-based elastomers of this invention that they have a much lower second-order transition temperature than the corresponding elastomers based on polyethers such as poly(tetramethylene oxide) and poly(ethylene oxide). Thus, the elastic fibers of this invention retain their elasticity at lower temperatures than do fibers from such polyether-based elastomers and are consequently better suited for use in extreme cold. This feature becomes important in fabrics for use in military apparel or in commercial applications under frigid conditions.

The urethane linkage between "hard" and "soft" segments may be obtained by routes other than by the reaction of diisocyanates with hydroxyl-terminated polyesters. For example, a hydroxyl-terminated polyester may be reacted with an excess of phosgene to form a bischloroformate which, upon subsequent reaction with a symmetrical aromatic diamine, and a biscarbamyl chloride, provides urea "hard" segments connected by urethane linkages to polyester "soft" segments. However, the preferred procedure is that in which a diisocyanate is used to react with the polyester for the formation of the urethane linkage. The formation of isocyanate-terminated polyester will be accompanied by no appreciable chain lengthening if two moles or more of diisocyanate are reacted per mole of polyester. If less than a 2:1 molar ratio is used, a polyester-urethane will be formed with corresponding increase in molecular weight. Such products are useful in the practice of this invention provided that the molecular weight of the chain-lengthened polymer is less than 5000. The use of a 2:1 molar ratio of diisocyanate:-polyester is preferred.

The reaction of the diisocyanate with the polyester is carried out in the usual manner, that is, by admixing the anhydrous reagents at steam bath temperatures. However, the polymerization of the isocyanate-terminated polyester with diamine is generally carried out at temperatures close to room temperature.

Although various methods of polymerization may be used in the reaction of the diamine with the macrodiisocyanate, solution polymerization is the preferred method. This method involves dissolving the diamine in a solvent and one or more complementary reactants in separate portions of the same solvent and then mixing the solutions under conditions suitable for forming high molecular weight polymers. The solvent is usually one which is relatively inert to the reactants. Suitable solvents for use in this process include N,N-dimethylformamide, N,N-dimethylacetamide, tetrahydrofuran, dimethylsulfoxide, and mixtures of acetone with N,N-dimethylformamide. To facilitate formation of high molecular weight polymers, acid acceptors are used in the system when an acid is liberated by the reaction, such as in the reaction of diamines with bischloroformates. Dimethylformamide and dimethylacetamide are the preferred solvents for use in the practice of this invention, especially since solutions suitable for the spinning of fibers may be made directly in these solvents.

For optimum results, the polyester-urethane-ureas of this invention should have an inherent viscosity of the order of 1.0–4.0 or above, although polymers having inherent viscosities as low as 0.5 are useful. Polymers in the lower molecular weight range are useful in certain applications such as in preparation of coatings and molded objects. However, the ones of particular interest are those which have molecular weights in the fiber-forming range, i.e., above about 10,000. Inherent viscosity is defined as $$\frac{\ln \eta_r}{C}$$

in which $\eta_r$ is the viscosity of a dilute solution of the polymer divided by the viscosity of the solvent in the same units and at the same temperature, and C is the concentration in grams of the polymer per 100 ml. of solution. The inherent viscosities recorded herein are measured at 20° C. at a concentration of 0.5 gram per 100 ml. of solution.

When the polymerization reaction has been carried out in a solvent in which the reaction product remains soluble, films or coatings may be formed by pouring or otherwise applying a solution to form a thin film and allowing the solvent to evaporate.

An outstanding feature of this invention is that it is possible to prepare fairly concentrated solutions of many of the polyester-urethane-urea polymers, and such solutions can be used directly in the preparation of filaments, bristles, and similar articles. Filaments can be prepared by dry or wet spinning. Conventional conditions are used for dry spinning except that the elastic filaments usually have to be talced or lubricated, usually with water, because they tend to be somewhat tacky immediately after extrusion. Spinning speeds are usually lower than those used in some commercial dry spinning processes for textile filaments, although speeds in excess of 300 yards per minute have been attained with elastic filaments, which represents excellent productivity for filaments of this type. It is usually found that superior elastic filaments are produced according to this invention by dry spinning rather than by wet spinning.

When wet spinning, the spinning speeds are usually lower, but this procedure has definite advantage when large denier filaments are being prepared. The preferred solvents for wet spinning are N,N-dimethylformamide and N,N-dimethylacetamide, and these solutions are usually extruded into a hot water bath.

It is possible to prepare stable dispersions of the elastomers of this invention, and shaped articles can be prepared by extruding, coagulating the dispersions, and coalescing the polymer particles. In some instances, heat coalescing is stationary, whereas for others a solvent will have to be used to promote coalescence.

Shaping and polymerization can also be combined into a single step. This procedure, known as "chemical spinning," comprises extruding the isocyanate-terminated polyester into a bath of the chain-extending diamine such that the polymer is produced in fiberform.

A drawing operation is usually not necessary to develop desirable properties, particularly satisfactory elastic properties, in the filaments of this invention. However, the over-all properties of the filaments are frequently improved by a drawing operation, which results in increased orientation and crystallinity in the final structure. Therefore, prior to final packaging, the yarns may be drawn at a suitable draw ratio such as 2 to 10× for the particular elastomer, and relaxed, to give a product with a desired combination of tenacity, initial modulus, yarn elongation, elasticity, and similar properties.

In the following examples, parts given are by weight, except where otherwise noted. "Tenacity" is a measure of the tensile strength of fibers expressed in grams per denier (g.p.d.). "Elongation" is the percent elongation of the fiber at the breaking point. "Initial modulus" is determined by measuring the initial slope of the stress-strain curve. "$M_{50}$" is the slope of the stress-strain curve at 50% elongation.

The examples are given merely by way of illustration and the invention is not limited thereto since any of the variations mentioned above may be incorporated in them with comparable results.

*Example I*

A mixture of 0.96 mole of ethylene glycol and 0.8 mole of adipic acid is heated under nitrogen for 24 hours at 185° C. and atmospheric pressure, and then for 24 hours at the same temperature at 0.1 mm. mercury pressure. There is obtained a polyethylene adipate melting at 44–48° C. having by analysis 860 OH groups and 109 carboxyl groups per million grams of polymer, indicating a molecular weight of 2070.

A mixture of 0.017 mole of the above-described polyester and 0.034 mole of p,p'-methylenediphenyl diisocyanate in 50–100 ml. of methylene chloride is stirred and heated under nitrogen for 2 hours at 100° C. Methylene chloride is evolved, and the viscous, isocyanate-terminated polyester is cooled to room temperature and dissolved in 35 ml. of N,N-dimethylformamide. To this solution is added rapidly 20 ml. of a solution of 0.017 mole of ethylenediamine in 40 ml. of dimethylformamide. The remaining diamine solution is added gradually over a period of 2–3 minutes. There is obtained a solution of a polyester-urethane-urea elastomer having good elasticity and a polymer melt temperature of 267° C. The dimethylformamide solution is wet spun into a hot water bath maintained at 90° C., yielding elastic fibers of 38 denier with the following properties: tenacity 0.63 g.p.d.; elongation 630%; initial modulus 0.06 g.p.d.; $M_{50}$ 0.06 g.p.d.; stress decay 4.5%; tensile recovery 93%; fiber sticking temperature 167° C. After 24 cycles of laundry testing (one cycle=40-minute immersion at 97° C. in an alkaline soap solution at pH 11), the properties are: tenacity 0.52 g.p.d.; elongation 689%; stress decay 6.8%; tensile recovery 96%.

Elastic fibers of ordinary rubber (Goodrich) have the following properties: tenacity 0.18 g.p.d.; elongation 570%; initial modulus 0.02 g.p.d.; $M_{50}$ 0.02 g.pd.; stress decay 1%; tensile recovery 98%; fiber sticking temperature 206° C.

*Example II*

A polyester is prepared from the reaction of 0.27 mole of 2,2-dimethyl-1,2-propanediol with 0.25 mole of sebacyl chloride at room temperature. After the vigorous evolution of hydrogen chloride subsides, the mixture is placed under 2 mm. pressure for 3 hours. The colorless, viscous, liquid polyester resulting analyzes for 804 OH groups and 29 carboxyl groups per million grams of polymer, indicating a molecular weight of 2480. As in the preceding example, this polyester is reacted in a 2:1 molar ratio with p,p'-methylenediphenyl diisocyanate. The isocyanate-terminated polyester is then chain-extended by reaction with an equimolar quantity of ethylenediamine to produce a segmented polymer having an inherent viscosity of 1.46 (measured in m-cresol). The polymer is wet spun from a 20% solution in dimethylacetamide into a water bath at 70° C. to yield a fiber having the following properties: tenacity 0.24 g.p.d.; elongation 638%; initial modulus 0.04 g.p.d.; $M_{50}$ 0.03 g.p.d.; stress decay 7%; tensile recovery 97%; fiber sticking temperature 170° C. After 32 laundry cycles as described in Example I, the following properties are measured: tenacity 0.24 g.p.d.; stress decay 6%; tensile recovery 98%.

The fibers described above (before the laundry test) are drawn 2.5× over a pin heated to 150° C. and dried for 2 hours at 100° C. The properties are then as follows: tenacity 0.40 g.p.d.; elongation 407%; initial modulus 0.04 g.p.d.; $M_{50}$ 0.04 g.p.d.; stress decay 6%; tensile recovery 95%; fiber sticking temperature 170° C.

*Example III*

Direct esterification is used to prepare a hydroxyl-terminated polyester from 0.45 mole of 2,2-diethyl-1,3-propanediol and 0.30 mole of sebacic acid. The product is obtained as a viscous liquid, analyzing for 1405 OH groups and 46 carboxyl groups per million grams of polymer, indicating a molecular weight of 1360. Two moles of p,p'-methylenediphenyl diisocyanate is reacted with one mole of this polyester to produce an isocyanate-terminated polyester which is taken up in dimethylacetamide. An equimolar quantity of ethylenediamine in dimethylacetamide is reacted with the isocyanate-terminated polyester as before. The solution is wet spun into water to yield elastic fibers having the following properties: tenacity 0.43 g.p.d.; elongation 475%; initial modulus 0.13 g.p.d.; $M_{50}$ 0.12 g.p.d.; stress decay 15%; tensile recovery 94%; fiber sticking temperature 170° C.

*Example IV*

Poly(ethylene adipate) having a molecular weight of 2410 is prepared by heating under nitrogen for 20 hours at 170–180° C. at atmospheric pressure, a mixture of 430 parts of adipic acid and 145 parts of ethylene glycol. The mixture is then heated for an additional 20 hours at 170–200° C. at one millimeter pressure. The product has by analysis 830 OH groups and 10 carboxyl groups per million grams of polymer, indicating a molecular weight of 2410. 24.1 parts (0.01 mole) of this polyester, melting at 52° C., is reacted with 3.57 parts (0.0201 mole) of 2,4-tolylene diisocyanate at 100–130° C. for 10–20 minutes. The isocyanate-terminated polyester is reacted with 1.50 parts (0.006 mole) of o-dichlorobenzidine at 100–120° C. A solution of 200 parts of this elastomer dissolved in 300 parts of dimethylformamide at 50° C. may be cast to yield a weakly elastic film, but is not spinnable into fibers. This is the preparation described in Example III of Brenschede U.S. 2,755,266.

*Example V*

200 parts (0.083 mole) of the poly(ethylene adipate) described in the preceding example is dissolved in 200 parts of dimethylformamide and the solution is heated to 130° C. To this solution is added 32 parts (0.145 mole) of 1,5-naphthylene diisocyanate, and subsequently 2 parts of water in 50 parts of dimethylformamide are added at 125–130° C. with stirring. After the evolution of carbon dioxide has ceased, an additional 550 parts of dimethylformamide is added to the mixture with stirring. The resulting solution is not viscous enough for dry spinning but may be wet spun into a glycerol bath at 80° C. The fibers are dried for 6 hours at 100° C. and display the following properties; tenacity 0.18 g.p.d.; elongation 520%; initial modulus 0.60 g.p.d.; stress decay 23%; tensile recovery 32%; fiber sticking temperature 85° C.

Such an elastic fiber, the preparation of which is described in Example IV of Brenschede U.S. 2,755,266, is useless for commercial application. The attainment of a satisfactory fiber by the knowledge of a suitable diisocyanate/chain-extender combination is shown in the following example.

*Example VI*

24.1 parts (0.01 mole) of the poly(ethylene adipate) described in Example IV is reacted with 5.20 parts (0.02 mole) of p,p'-methylenediphenyl diisocyanate. The isocyanate-terminated polyester so produced is treated with 0.60 part (0.01 mole) of ethylenediamine in 105 parts of dimethylformamide and wet spun into a glycerol bath at 80° C. After drying for 6 hours at 100° C. the fibers display the following properties: tenacity 0.17 g.p.d.; elongation 520%; initial modulus 0.06 g.p.d.; stress decay 19%; tensile recovery 90%; fiber sticking tempearture 150° C.

*Example VII*

24.1 parts of the poly(ethylene adipate) described in Example IV are reacted with 4.20 parts of 1,5-naphthylene diisocyanate. The isocyanate-terminated polyester is taken up in 100 parts of dimethylformamide and reacted with a solution of 0.60 part of ethylenediamine in 20 parts of dimethylformamide. The porduct gels almost immediately upon addition of the diamine and is not suitable for the spinning of fibers.

*Example VII-A*

200 parts of the poly(ethylene adipate) of Example I is heated at steam bath temperatures with 50 grams of p,p'-methylenediphenyl diisocyanate for 1 hour with stirring. This product is dissolved in N,N-dimethylacetamide at room temperature, and 2 grams of water is added and the mixture heated for 5 hours on the steam bath. The polymer solution obtained contains about 20% polymer. The solution is dry spun in the usual manner, yielding filaments having the following properties: tenacity=0.62 g.p.d., elongation=906%, initial modulus=0.02 g.p.d., stress decay=4.8%, tensile recovery=95%, and fiber stick temperature=165° C.

*Example VIII*

A hydroxyl-terminated copolyester is prepared from 21.6 moles of ethylene glycol, 14.4 moles of propylene glycol, and 30 moles of adipic acid, to yield a polymer having by analysis 700 OH groups and 12 carboxyl groups per million grams of polymer, indicating a molecular weight of 2820. 28.2 parts (0.01 mole) of this polyester is reacted under nitrogen with 5.2 parts (0.02 mole) of p,p'-methylenediphenyl diisocyanate for 1 hour at 90–95° C. The isocyanate-terminated polyester and 8.33 parts of additional diisocyanate are dissolved in 100 parts of dimethylformamide. A solution of 5.03 parts of 2,5-dimethylpiperazine in 15 parts of dimethylformamide is added slowly with stirring. After about 30 minutes the resulting solution is dry spun into fibers at 100° C. in the usual manner. The elastic fibers, containing 70% by weight of polyester, having the following properties: tenacity 0.50 g.p.d.; elongation 600%; initial modulus 0.25 g.p.d.; stress decay 10%; tensile recovery 93%; fiber sticking temperature 200° C.

*Example IX*

A hydroxyl-terminated polyester of molecular weight 2900 is prepared by ester exchange in the usual way from 0.375 mole of 2,2-dimethyl-1,3-propanediol and 0.125 mole of dimethyl sebacate. The light yellow, viscous polymer, analyzing for 665 OH groups and 26 carboxyl groups per million grams of polymer, is converted to a macrodiisocyanate by reacting one mole of the polyester with two moles of p,p'-methylenediphenyl diisocyanate. For this reaction, the macrodiisocyanate is extruded into a bath of ethylenediamine to produce an elastic fiber which may be wound up as formed. The 326-denier fiber has the following properties: tenacity 0.15 g.p.d.; elongation 484%; initial modulus 0.03 g.p.d.; $M_{50}$ 0.03 g.p.d.; stress decay 8%; tensile recovery 96%; fiber sticking temperature 170° C.

The filaments of this invention have properties which make them useful in such applications as fabrics, rope, paper, and felt, among others. The elastic filaments of this invention are useful as binders for papers and laminates. The higher tenacities, high initial modulus, superior abrasion resistance, and more easily controlled elongation of the filaments of this invention fit them for many applications for which rubber filaments are undesirable. Most of these filaments possess the additional advantage that they are easily fabricated.

It is sometimes necessary to stabilize certain of the compositions to heat or ultraviolet radiation. Fortunately, this can be done very readily by incorporating stabilizers. Satisfactory stabilizers comprise phenols and their derivatives, amines and their derivatives, compounds containing both hydroxyl and amine groups, hydroxyazines, oximes, polymeric phenolic esters, and salts of multivalent metals in which the metal is in its lower valence state.

The elastic fibers of this invention possess a number of advantageous properties including excellent resistance to heat and cold, outstanding resistance to mechanical abrasion, and to deterioration caused by stretching, flexing and the like. This combination of properties suggests the use of these polymers as uncovered filaments in elastic fabrics and garments. Obviously, these filaments and fibers can also be useful in fabrics and garments when they are covered, as rubber is for such applications. The elastic yarns of this invention are characterized by higher strength and stretch modulus than any rubber threads known. Stretch modulus measures the force required to elongate the yarn a given percentage. A garment made of yarns having high tenacity and high stretch modulus will not only be durable but will also exert substantial pressure on the body of the wearer after the garment is stretched into position as desired, for example, in surgical stockings.

Yarns of this invention have many advantages over rubber threads. For example, they may be spun readily into multifilament yarns and into low denier filaments. They have superior abrasion resistance, very low inherent color, may be dyed by common dyestuffs, need no plasticizers which might be later leached out of the yarn, and have a good resistance to perspiration or greases and many other common chemicals. Furthermore, these elastic yarns are capable of very quick elastic recovery, a property which is lacking in many of the so-called elastic fibers.

The elastic properties of these materials may be varied by suitable compounds. The amount and type of compounding agent to be incorporated is dependent on the use for which the elastomer is intended. The compounding agents ordinarily used in the rubber industry are useful for this invention. These include carbon black, clay, silica, pigments, and plasticizers. Inorganic and organic coloring agents may be incorporated to give a well-defined color.

It will be apparent that many widely different embodiments of this invention may be made without departing from the spirit and scope thereof, and therefore it is not intended to be limited except as indicated in the appended claims.

I claim:

1. An elastic fiber having a tensile recovery of at least 90%, a stress decay below about 20%, and an essentially linear polymeric structure being provided by a linear segmented polyester-urethane-urea polymer having a polymer melt temperature above about 150° C. and substantially complete solubility at a concentration of 0.5% in m-cresol at 20° C., said segmented polymer consisting essentially of a plurality of intralinear structural units having the formula

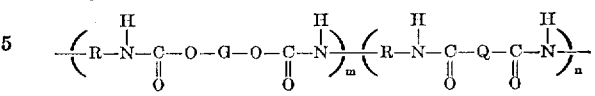

wherein $m$ and $n$ are integers greater than 0, G is a long-chain linear polymeric radical free from substituents reactive with an isocyanate and having recurring ester linkages of the formula

in the polymer chain, said radical G having a structure such that a hydroxyl-terminated polyester of the formula HO—G—OH has a melting point below about 60° C. and a molecular weight above about 600, R is a symmetrical aromatic radical selected from the group consisting of para-positioned phenylene, biphenylene, and alkylene diphenyl radicals, and Q is a bivalent organic radical selected from the group consisting of the formula

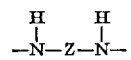

and a piperazino radical wherein Z is a radical selected from the group consisting of alkylene, cyclohexylene, aralkylene, alkarylene and arylene radicals, said arylene radicals being free from fused rings and each of said radicals Z being free from substituents reactive with an isocyanate, the radicals R and Q being so selected that the structure

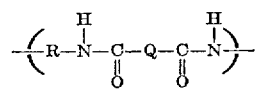

represents a repeating unit of a linear urea polymer having a melting point above 200° C. in the molecular weight range above about 10,000, from about 60% to about 90% by weight of said segmented polymer being provided by said radical G.

2. The fiber of claim 1 in which the fiber stick temperature is above 150° C.

3. The fiber of claim 1 in which the said polyester has a molecular weight between about 600 and 5,000.

4. The fiber of claim 1 in which the said polyester has a molecular weight between about 1,000 and 3,000.

5. The product of claim 1 in which the said polyester melts below 50° C.

6. The fiber of claim 1 in which said segmented polymer has an inherent viscosity of at least 1.0.

7. The fiber of claim 1 having a denier below 200.

8. The fiber of claim 1 having a denier below 50.

9. A fiber of claim 1 which has been dry spun and has a denier between 1 and about 20.

10. The fiber of claim 1 in which the urea polymer has a melting point above 250° C.

11. The fiber of claim 1 wherein R is the aromatic radical remaining after removal of the isocyanate groups from p,p'-methylenediphenyl diisocyanate.

12. An elastic fiber having a tensile recovery of at least 90%, a stress decay below about 20%, and an essentially linear polymeric structure being provided by a linear segmented polyester-urethane-urea polymer having a polymer melt temperature above about 150° C. and substantially complete solubility at a concentration of 0.5% in m-cresol at 20° C., said segmented polymer consisting essentially of a plurality of intralinear structural units having the formula

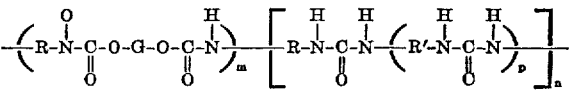

wherein $m$ and $n$ are integers greater than 0, $p$ is an integer from 0 to 1, G is a long-chain linear polymeric radical free from substituents reactive with an isocyanate and having recurring ester linkages of the formula

in the polymer chain, said radical G having a structure such that a hydroxyl-terminated polyester of the formula HO—G—OH has a melting point below about 60° C. and a molecular weight above about 600, R is an aromatic radical selected from the group consisting of p-phenylene, 4,4'-biphenylene, p,p'-methylenediphenyl, p,p'-isopropylidenediphenyl radicals, and R' is a bivalent organic radical selected from the group consisting of alkylene radicals having from 2 to 8 carbon atoms, p-xylylene, cyclohexylene, p-phenylene, p,p'-methylenediphenylene and tolylene radicals, said radical R' being free from substituents reactive with an isocyanate, the radicals R and R' being so selected that the structure

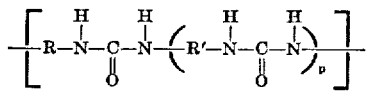

represents a repeating unit of a linear urea polymer having a melting point above 200° C. in the molecular weight range above about 10,000, from about 60% to about 90% by weight of said segmented polymer being provided by said radical G.

References Cited in the file of this patent

UNITED STATES PATENTS

| | | |
|---|---|---|
| 2,620,516 | Muller | Dec. 9, 1952 |
| 2,625,532 | Seeger | Jan. 13, 1953 |
| 2,650,212 | Windemuth | Aug. 25, 1953 |
| 2,692,874 | Langerak | Oct. 26, 1954 |
| 2,723,265 | Stallmann | Nov. 8, 1955 |
| 2,755,266 | Brenschede | July 17, 1956 |
| 2,785,150 | Kreider et al. | Mar. 12, 1957 |
| 2,813,776 | Holler | Nov. 19, 1957 |
| 2,818,404 | Hill | Dec. 31, 1957 |
| 2,929,804 | Steuber | Mar. 22, 1960 |

FOREIGN PATENTS

| | | |
|---|---|---|
| 700,610 | Great Britain | Dec. 9, 1953 |
| 1,116,218 | France | Jan. 30, 1956 |
| 872,268 | Germany | Mar. 30, 1953 |

OTHER REFERENCES

Bayer et al.: Rubber Chem. and Tech., October-December, 1950, pages 812–35.

Seeger et al.: Ind. and Eng. Chem., November 1953, pp. 2538–2542.

Ser. No. 397,744, Schlack (A.P.C.), published April 20, 1943.

---

UNITED STATES PATENT OFFICE
CERTIFICATE OF CORRECTION

Patent No. 3,097,192          July 9, 1963

Roberta J. Schilit

It is hereby certified that error appears in the above numbered patent requiring correction and that the said Letters Patent should read as corrected below.

Column 3, line 50, for "arkarylene" read -- alkarylene --; column 4, line 18, for "guantity" read -- quantity --; column 8, line 1, for "stationary" read -- satisfactory --; line 71, for "-1,2-propanediol" read ---1,3-propanediol --.

Signed and sealed this 21st day of January 1964.

(SEAL)
Attest:

ERNEST W. SWIDER          EDWIN L. REYNOLDS

Attesting Officer          Acting Commissioner of Patents radical free from substituents reactive with an isocyanate and having recurring ester linkages of the formula

in the polymer chain, said radical G having a structure such that a hydroxyl-terminated polyester of the formula HO—G—OH has a melting point below about 60° C. and a molecular weight above about 600, R is an aromatic radical selected from the group consisting of p-phenylene, 4,4'-biphenylene, p,p' - methylenediphenyl, p,p' - isopropylidenediphenyl radicals, and R' is a bivalent organic radical selected from the group consisting of alkylene radicals having from 2 to 8 carbon atoms, p-xylylene, cyclohexylene, p-phenylene, p,p'-methylenediphenylene and tolylene radicals, said radical R' being free from substituents reactive with an isocyanate, the radicals R and R' being so selected that the structure

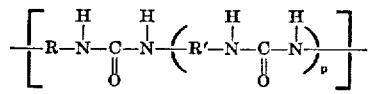

represents a repeating unit of a linear urea polymer having a melting point above 200° C. in the molecular weight range above about 10,000, from about 60% to about 90% by weight of said segmented polymer being provided by said radical G.

References Cited in the file of this patent
UNITED STATES PATENTS

| | | |
|---|---|---|
| 2,620,516 | Muller | Dec. 9, 1952 |
| 2,625,532 | Seeger | Jan. 13, 1953 |
| 2,650,212 | Windemuth | Aug. 25, 1953 |
| 2,692,874 | Langerak | Oct. 26, 1954 |
| 2,723,265 | Stallmann | Nov. 8, 1955 |
| 2,755,266 | Brenschede | July 17, 1956 |
| 2,785,150 | Kreider et al. | Mar. 12, 1957 |
| 2,813,776 | Holler | Nov. 19, 1957 |
| 2,818,404 | Hill | Dec. 31, 1957 |
| 2,929,804 | Steuber | Mar. 22, 1960 |

FOREIGN PATENTS

| | | |
|---|---|---|
| 700,610 | Great Britain | Dec. 9, 1953 |
| 1,116,218 | France | Jan. 30, 1956 |
| 872,268 | Germany | Mar. 30, 1953 |

OTHER REFERENCES

Bayer et al.: Rubber Chem. and Tech., October-December, 1950, pages 812–35.

Seeger et al.: Ind. and Eng. Chem., November 1953, pp. 2538–2542.

Ser. No. 397,744, Schlack (A.P.C.), published April 20, 1943.

---

UNITED STATES PATENT OFFICE
CERTIFICATE OF CORRECTION

Patent No. 3,097,192             July 9, 1963

Roberta J. Schilit

It is hereby certified that error appears in the above numbered patent requiring correction and that the said Letters Patent should read as corrected below.

Column 3, line 50, for "arkarylene" read -- alkarylene --; column 4, line 18, for "guantity" read -- quantity --; column 8, line 1, for "stationary" read -- satisfactory --; line 71, for "-1,2-propanediol" read ---1,3-propanediol --.

Signed and sealed this 21st day of January 1964.

(SEAL)
Attest:

ERNEST W. SWIDER            EDWIN L. REYNOLDS

Attesting Officer            Acting Commissioner of Patents

UNITED STATES PATENT OFFICE
CERTIFICATE OF CORRECTION

Patent No. 3,097,192　　　　　　　　　　　　　　July 9, 1963

Roberta J. Schilit

It is hereby certified that error appears in the above numbered patent requiring correction and that the said Letters Patent should read as corrected below.

Column 3, line 50, for "arkarylene" read -- alkarylene --; column 4, line 18, for "guantity" read -- quantity --; column 8, line 1, for "stationary" read -- satisfactory --; line 71, for "-1,2-propanediol" read ---1,3-propanediol --.

Signed and sealed this 21st day of January 1964.

(SEAL)
Attest:

ERNEST W. SWIDER　　　　　　　　　　　　　EDWIN L. REYNOLDS

Attesting Officer　　　　　　　　　　　Acting Commissioner of Patents